United States Patent [19]
Büchel et al.

[11] 3,723,622
[45] Mar. 27, 1973

[54] FUNGICIDAL COMPOSITION AND METHODS OF KILLING FUNGI USING 1-TRITYL-1,2,4-TRIAZOLES

[75] Inventors: Karl Heinz Buchel, Wuppertal-Elberfeld; Ferdinand Grewe; Helmut Kospers, both of Leverkusen, all of Germany

[73] Assignee: Farbenfabriken Bayer Aktiengesellschaft, Leverkusen, Germany

[22] Filed: Apr. 19, 1972

[21] Appl. No.: 245,603

Related U.S. Application Data

[62] Division of Ser. No. 848,738, Aug. 8, 1969, Pat. No. 3,682,950.

[30] Foreign Application Priority Data

Aug. 28, 1968   Germany.....................P 17 95 249.7

[52] U.S. Cl................................................424/269
[51] Int. Cl. ..........................A01n 9/00, A01n 9/22
[58] Field of Search.......................................424/269

[56] References Cited

UNITED STATES PATENTS 3,321,366   5/1967   Mussell et al.........................260/309

FOREIGN PATENTS OR APPLICATIONS 1,215,164   4/1966   Germany...........................260/308

*Primary Examiner*—Jerome D. Goldberg
*Assistant Examiner*—Allen J. Robinson
*Attorney*—Burgess, Dinklage & Sprung

[57] ABSTRACT

1-Trityl-1,2,4-triazoles, i.e. 1-[(optionally mono and di chloro-, fluoro-, cyano- and trifluoromethyl- substituted)-(optionally mono and di chloro-, fluoro-, cyano- and trifluoromethyl- substituted)-(optionally mono and di chloro-, fluoro-, cyano- and trifluoromethyl- substituted)-trityl]-3-(optionally chloro substituted)-5-(optionally chloro substituted)-1,2,4-triazoles, or 1-[(optionally mono and di chloro, fluoro-, cyano- and trifluoromethyl- substituted phenyl)-(optionally mono and di chloro-, fluoro-, cyano- and trifluoromethyl- substituted phenyl)-(optionally mono and di chloro-, fluoro-, cyano- and trifluoromethyl- substituted phenyl)-methyl]-3-(optionally chloro-substituted)-5-(optionally chloro substituted)-1,2,4-triazoles, possess fungicidal properties.

12 Claims, No Drawings

FUNGICIDAL COMPOSITION AND METHODS OF KILLING FUNGI USING 1-TRITYL-1,2,4-TRIAZOLES

This is a division of application of Ser. No. 848,738 filed Aug. 8, 1969, now U.S. Pat. No. 3,682,950 issued Aug. 8, 1972.

The present invention relates to and has for its objects the provision for particular new 1-trityl-1,2,4-triazoles, i.e. 1-[(optionally mono and di chloro-, fluoro-, cyano- and trifluoromethyl- substituted)-(optionally mono and di chloro-, fluoro-, cyano- and trifluoromethyl- substituted)-(optionally mono and di chloro-, fluoro, cyano- and trifluoro-methyl- substituted)-trityl]-3-(optionally chloro substituted)-5-(optionally chloro substituted)-1,2,4-triazoles, or 1-[(optionally mono and di chloro-, fluoro-, cyano- and trifluoro-methyl- substituted phenyl)-(optionally mono and di chloro-, fluoro-, cyano- and trifluoromethyl-substituted phenyl)-(optionaly mono and di chloro-, fluoro-, cyano- and trifluoromethyl-substituted phenyl)-methyl]-3-(optionally chloro-substituted)-5-(optionally chloro-substituted)-1,2,4-triazoles, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known that certain N-tritylimidazoles, such as N-tritylimidazole (A) per se, exhibit fungitoxic properties (compare U.S. Pat. No. 3,321,366).

It has now been found, in accordance with the present invention, that the particular new 1-trityl-1,2,4-triazoles of the formula

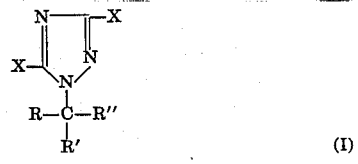

(I)

in which

X each individually is hydrogen, or chloro, and

R, R' and R'' each individually is phenyl, chlorophenyl, dichlorophenyl, fluorophenyl, cyanophenyl, or trifluoromethylphenyl, and the corresponding hydrochloric acid and lactic acid salts thereof, exhibit strong fungicidal properties.

It has been furthermore found, in accordance with the present invention, that the particular new compounds of formula (I) above may be produced by the process which comprises reacting a trityl halide of the formula

(II)

in which

R, R' and R'' are the same as defined above, and

Hal is halo, such chloro, bromo, iodo or fluoro, especially chloro, with a 1,2,4-triazole of the formula

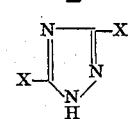

(III)

in which

X each individually is the same as defined above, in a polar, inert organic solvent at a temperature of from about 0° to 100° C in the presence of an acid-binding agent.

Optionally, the 1,2,4-triazoles so obtained are reacted with organic or inorganic acids, e.g., lactic acid or hydrochloric acid, to give the appropriate salts.

It is very surprising that the specific 1-trityl-1,2,4-triazoles of formula (I) according to the present invention, and their salts of organic and inorganic acids, e.g., the lactate and hydrochloride salts, have a considerably stronger fungitoxic activity, in particular against the causative organisms of powdery mildew of apples (*Podosphaera leucotricha* Salm.), than the previously known N-tritylimidazoles, such as N-tritylimidazole (A) per se. The active compounds according to the present invention therefore represent a valuable contribution to the art.

The course of the production reaction according to the present invention is illustrated by the following equation:

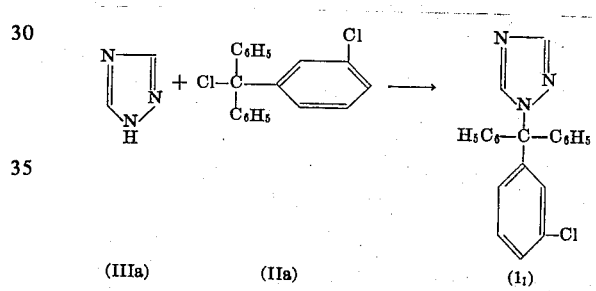

(IIIa)    (IIa)    (I₁)

Advantageously, in accordance with the present invention, in the various formulas set forth herein:

X, each individually, represents
   hydrogen; or
   chloro; and

R, R' and R'', each individually, represents
   phenyl;
   chlorophenyl such as 2-, 3- and 4 chlorophenyl;
   dichlorophenyl such as 2,3-, 2,4-, 2,5-, 2,6-, 3,4- and 3,5- dichlorophenyl, especially 2,4-dichlorophenyl;
   fluorophenyl such as 2-, 3- and 4- fluorophenyl, especially 4-fluorophenyl;
   cyanophenyl such as 2-, 3- and 4- cyanophenyl; and
   trifluoromethylphenyl such as 2-, 3- and 4- trifluoromethylphenyl, especially 3-trifluoromethylphenyl;
with the proviso that the corresponding compounds having the above defined symbols may also be present in the form of their organic and inorganic salts, such as the lactic acid salts and the hydrochloric acid salts thereof.

Preferably, each X individually is hydrogen; or chloro; R is phenyl; or chlorophenyl; or dichlorophenyl; and fluorophenyl; or cyanophenyl; or trifluoromethylphenyl; and R' and R'' are phenyl; or chlorophenyl; with the proviso that the corresponding compounds also include the lactate and hydrochloride salts thereof.

In particular, one X is hydrogen and the other X is hydrogen or chloro; R is phenyl; or chlorophenyl; or 2,4-dichlorophenyl; or 4-fluorophenyl; or cyanophenyl; or 3-trifluoromethylphenyl; and R' and R'' are phenyl; or 4-chlorophenyl; with the proviso that the corresponding compounds also include the lactate and hydrochloride salts thereof when X is hydrogen; R is phenyl; or chlorophenyl; or 2,4-dichlorophenyl; and R' and R'' are phenyl.

The trityl halides required as starting materials are clearly characterized by formula (II) above.

In this regard, such trityl halides required as starting materials are known in part. The new starting trityl halides can be prepared in the same manner as the already known ones.

Preparation of these can for example be carried out as follows:

a. First, a Grignard compound of mono- or di- substituted benzene is prepared in the known manner. The substituted phenylmagnesium bromide so obtained is then reacted with (the corresponding optionally substituted) benzophenone.

b. The organometallic complex compound thus obtained is subjected to hydrolysis, the appropriate carbinol being formed (compare J. Org. Chem. 7, 392 (1942)).

c. From the carbinol, the chloride can be obtained in simple manner when the carbinol is reacted with anhydrous hydrogen chloride or with thionyl chloride. The hydroxyl group is replaced by chlorine (compare J. Org. Chem. 7, 392 (1942)).

The triazoles also required as starting materials are clearly characterized by the formula (III) above.

These starting triazoles are likewise largely known. The hitherto unknown compounds can be prepared in the same manner as the known triazoles.

For the instant reaction of trityl halides with 1,2,4-triazoles, polar inert organic solvents are advantageously used. These include, for example, nitriles, such as acetonitrile; sulfoxides, such as dimethyl sulfoxide; formamides, such as dimethyl formamide; ketones, such as acetone; ethers, such as diethyl ether; nitroalkanes, such as nitromethane; and other substituted hydrocarbons, such as for example chloroform; and the like. Particularly suitable are polar inert solvents which have a dielectric constant of more than 2.4.

The production reaction is carried out in the presence of an acid-binding agent. Preferably, a suitable excess of tertiary amine, such as, for example, triethylamine or dimethylbenzyl-amine, is used. However, an excess of the starting 1,2,4-triazole may also be employed, or other customarily used organic acid-binding agents.

The production reaction temperatures can be varied within a fairly wide range. In general, the work is carried out at substantially between about 0°–100° C, preferably between about 50°–90° C.

When carrying out the process according to the present invention, the starting materials may be used in the molar ratio of 1:1:1 with the acid-binding agent. The reaction time depends on the reaction temperature and is generally between about 3 and 24 hours. In the working up of the reaction mixture, the solvent is removed and the reaction product is freed from amine hydrochloride by washing with water or, if the amine hydrochloride is sparingly soluble in water, separated from the hydrochloride with an organic solvent.

Advantageously, the active compounds according to the present invention exhibit a strong fungitoxic activity, and are distinguished by a broad spectrum of activity. Their low toxicity to warm-blooded animals and their good compatibility with higher plants permits the use of the instant compounds as crop protection agents against fungal diseases.

In the concentrations necessary for the control of fungi, it will be appreciated that the instant active compounds do not damage cultivated plants.

Fungitoxic agents in crop protection as contemplated herein are used for the control of fungi from the most diverse classes of fungi, such as *Archimycetes*, *Phycomycetes*, *Ascomycetes*, *Basidiomycetes* and *Fungi Imperfecti*.

The active compounds according to the present invention can be used against parasitic fungi on above-the-soil parts of plants, fungi which cause tracheomycosis, which attack the plant from the soil, seed-borne fungi and soil-inhabiting fungi. Such compounds are particularly effective against fungi which cause powdery mildew diseases. This group of fungi includes predominantly representatives from the family of the *Erysiphaceae* with the most important genera *Erysiphe*, *Uncinula* (*Oidium*), *Sphaerotheca*, *Podosphaera*, and the like. As important fungi in this connection, there are mentioned in particular: *Erysiphe polyphaga*, *Podosphaera leucotricha*, *Uncinula necator*, and the like.

The active compounds according to the present invention also show an insecticidal and acaricidal activity, particularly against insects and acarids which infest useful plants. It will be realized that in concentrations higher than those fungicidally necessary, as specified hereinabove, the instant active compounds have an inhibitory effect on plant growth.

The active compounds according to the instant invention can be utilized, if desired, in the form of the usual formulations or compositions with conventional inert (i.e., plant compatible or herbicidally inert) pesticidal diluents or extenders, i.e., diluents or extenders of the type usable in conventional pesticidal formulations or compositions, e.g., conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g., conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.0005–2.0 percent, preferably 0.001–0.05 percent, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally about 0.0005–95 percent, and preferably 0.001–95 percent, by weight of the mixture.

Generally, 0.001–0.05 percent by weight concentrations of the active compound are sufficiently effective, although aqueous preparations having concentrations of 0.0005–2.0 percent by weight of the active compound are normally used.

The active compound can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95 percent by weight of the active compound, or even the 100 percent active substance alone, e.g., about 20–100 percent by weight of the active compound.

In particular, the present invention contemplates methods of selectively killing, combating or controlling fungi, which comprises applying to at least one of (a) such fungi and (b) their habitat, i.e., the locus to be protected, a fungicidally effective or toxic amount of the particular active compound of the invention alone or together with a carrier vehicle as noted above. The instant formulations or compositions are applied in the usual manner, for instance by squirting, spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the new compounds of the present invention is illustrated, without limitation, by the following Examples.

EXAMPLE 1

*Erysiphe Test*

Solvent: 4.7 parts by weight acetone
Emulsifier: 0.3 part by weight alkylaryl polyglycol ether
Water: 95.0 parts by weight The amount of the particular active compound required for the desired final concentration in the spray liquid is mixed with the stated amount of solvent, and the resulting concentrate is diluted with the stated amount of water containing the stated emulsifier.

Young cucumber plants (Delikatess variety) with about three foliage leaves are sprayed with the spray liquid until dripping wet. The cucumber plants remain in a greenhouse for 24 hours to dry. The plants are then, for the purpose of inoculation, dusted with conidia of the fungus *Erysiphe polyphaga*. The plants are subsequently placed in a greenhouse at 23°–24° C, and at a relative atmospheric humidity of about 75 percent.

After 12 days, the infestation of the cucumber plants is determined as a percentage of the untreated but also inoculated control plants.

0 percent means no infestation; 100 percent that the infestation is exactly as great as in the case of the control plants.

The particular active compounds tested, their concentrations, and the results obtained can be seen from the following Table 1:

TABLE 1.—ERYSIPHE TEST

| Active compound No. (see Ex. 3 to 5) | Infestation as a percentage of the infestation of the untreated control with a concentration of active compound of— | |
|---|---|---|
| | 0.00078% | 0.00019% |
| (A) | 13 | 53 |

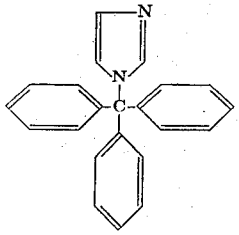

(known)

| | | |
|---|---|---|
| (1₂) | 0 | 0 |
| (2₁) | 0 | 33 |
| (3₁) | 0 | 0 |
| (4₁) | 0 | 13 |
| (5₁) | 0 | 0 |
| (18₁) | 0 | 36 |
| (20₁) | 6 | --- |
| (7₁) | 0 | 26 |
| (8₁) | 0 | 36 |
| (9₁) | 6 | 26 |

EXAMPLE 2

*Podosphaera Test* (powdery mildew of apples) [Protective]

Solvent: 4.7 parts by weight acetone
Emulsifier: 0.3 part by weight alkylaryl polyglycol ether
Water: 95.0 parts by weight The amount of the particular active compound required for the desired final concentration of the active compound in the spray liquid is mixed with the stated amount of solvent, and the resulting concentrate is diluted with the stated amount of water which contains the stated emulsifier.

Young apple seedlings in the 4 – 6 leaf stage are sprayed with the spray liquid until dripping wet. The plants remain in a greenhouse for 24 hours at 20° C and at a relative atmospheric humidity of 70 percent. The plants are then inoculated by dusting with conidia of the apple powder mildew causative organism (*Podosphaera leucotricha Salm.*) and placed in a greenhouse at a temperature of 21° - 23° C and at a relative atmospheric humidity of about 70 percent.

Ten days after inoculation, the infestation of the seedlings is determined as a percentage of the untreated but also inoculated control plants.

0 percent means no infestation; 100 percent means that the infestation is exactly as great as in the case of the control plants.

The particular active compounds tested, their concentrations, and the results obtained can be seen from the following Table 2:

TABLE 2.—PODOSPHAERA TEST (PROTECTIVE)

| Active compound No. (see Ex. 3 to 5) | Infestation as a percentage of the infestation of the untreated control with a concentration of active compound of— | |
|---|---|---|
| | 0.00039% | 0.00009% |
| (A) | 39 | 78 |

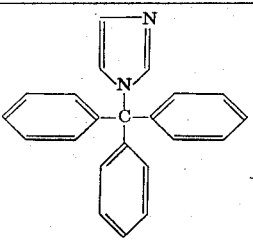

(known)

TABLE 2.—PODOSPHAERA TEST (PROTECTIVE)—Continued

| Active compound No. (see Ex. 3 to 5) | Infestation as a percentage of the infestation of the untreated control with a concentration of active compound of— | |
|---|---|---|
| | 0.00039% | 0.00009% |
| (1₂) | 0 | 23 |
| (2₂) | 34 | 41 |
| (3₂) | 14 | 33 |
| (4₂) | 14 | 51 |
| (5₂) | 23 | 59 |
| (18₂) | 0 | 19 |
| (7₂) | 9 | 53 |
| (8₂) | 5 | 28 |
| (9₂) | 13 | 41 |

EXAMPLE 3

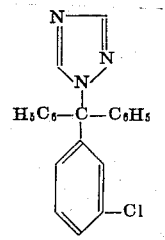

(1₁)

6.9 g (0.1 mol) 1,2,4-triazole are dissolved in 250 ml of absolute acetonitrile, 31.4 g (0.1 mol) 3-chlorophenyl-diphenyl-methyl chloride and 10.5 g (about 0.11 mol) triethyl amine are added thereto, and the mixture is heated to 80° C for 4 hours. After cooling, the amine hydrochloride and, in part, the reaction products, separate. The solvent is distilled off and the residue is washed out with water until Cl ions can no longer be detected. After drying, recrystallization from acetone is effected. 30 g (90 percent of the theory) of 1-(3'-chlorophenyl-bis-phenyl-methyl)-1,2,4-triazole are obtained in the form of colorless crystals of m.p. 119° C.

EXAMPLE 4

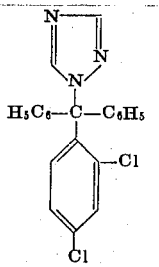

(10₁)

6.9 g (0.1 mol) 1,2,4-triazole are dissolved in 250 ml of absolute dimethyl formamide, and 34.7 g (0.1 mol) 2,4-dichloro-phenyl-diphenyl-methyl chloride and 10.5 g (0.11 mol) triethyl amine are then added thereto. The mixture is heated to 80° to 90° C for 3 hours and the solvent is then drawn off in a vacuum. The residue is freed from the amine hydrochloride by washing with water, then taken up in methylene chloride, dried with Na₂SO₄ and, after the methylene chloride has been drawn off, recrystallized from acetone. 36 g (98 percent of the theory) of 1-(2',4'-dichloro-phenyl-bisphenyl-methyl)-1,2,4-triazole are obtained in the form of light-beige crystals of m.p. 187°-189° C.

In analogy with Examples 3 and 4, the following compounds according to formula (I) above are similarly prepared:

TABLE A

| Active compound | X | R | R' | R'' | M.P., °C. |
|---|---|---|---|---|---|
| (11₁) | H | C₆H₅ | C₆H₅ | C₆H₅ | 219 |
| (2₃) | H | –C₆H₄–Cl (4-Cl) | C₆H₅ | C₆H₅ | 123 |
| (3₃) | H | –C₆H₄–Cl (3-Cl) | C₆H₅ | C₆H₅ | 154 |
| (12₁) | H | –C₆H₄–Cl | –C₆H₄–Cl | –C₆H₄–Cl | 147 |
| (4₃) | H | –C₆H₄–F | C₆H₅ | C₆H₅ | 156 |
| (5₃) | H | –C₆H₄–CF₃ | C₆H₅ | C₆H₅ | 128–130 |
| (13₁) | H | –C₆H₄–CN | C₆H₅ | C₆H₅ | 155 |
| (14₁) | 3-Cl,5-H | C₆H₅ | C₆H₅ | C₆H₅ | 235 |
| (15₃) | H | –C₆H₄–F (3-F) | C₆H₅ | C₆H₅ | 181 |
| (16₁) | H | –C₆H₄–CN (4-CN) | C₆H₅ | C₆H₅ | 189–193 |
| (17₂) | H | –C₆H₄–CN | C₆H₅ | C₆H₅ | 171–172 |

EXAMPLE 5

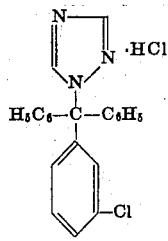

(18₁)

16 g (0.09 mol) 1-(3'-chlorophenyl-bisphenyl-methyl)-1,2,4-triazole are dissolved in 300 ml carbon tetrachloride (or diethyl ether) and the necessary amount of HCl gas is introduced. The solvent is then distilled off and the residue is recrystallized from acetone/ether (2:5). 16.5 g of 1-(3'-chlorophenyl-bisphenyl-methyl)-1,2,4-triazole hydrochloride are obtained as colorless, hygroscopic crystals of m.p. 154°C.

In analogy with Example 5 the following compounds according to formula (I) above are similarly prepared:

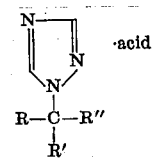

(I')

TABLE B

| Active compound | Acid | R | R' | R'' | M.P., °C. |
|---|---|---|---|---|---|
| (19₁) | HCl | C₆H₅ | C₆H₅ | C₆H₅ | 135 |
| (20₁) | HCl | –C₆H₄–Cl | C₆H₅ | C₆H₅ | 105–109 |
| (21₁) | HCl | –C₆H₃(Cl)₂ | C₆H₅ | C₆H₅ | 165 |
| (6₂) | CH₃CHOHCO₂H | –C₆H₄–Cl | C₆H₅ | C₆H₅ | Wax |
| (22₁) | CH₃CHOHCO₂H | –C₆H₃(Cl)₂ | C₆H₅ | C₆H₅ | Wax |

TABLE B Continued

| Active compound | Acid | R | R' | R'' | M.P., °C. |
|---|---|---|---|---|---|
| (2₃) | CH₃CHOHCO₂H | C₆H₅ | C₆H₅ | C₆H₅ | 180 |
| (7₃) | CH₃CHOHCO₂H | (2-chlorophenyl) | C₆H₅ | C₆H₅ | Wax |
| (8₃) | HCl | (4-chlorophenyl) | C₆H₅ | C₆H₅ | 172 |
| (9₃) | CH₃CHOHCO₂H | 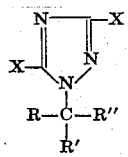 | C₆H₅ | C₆H₅ | Wax |

The following compounds are particularly preferred:
1. 1-(3'-chlorophenyl-bis-phenyl-methyl)-1,2,4-triazole
2. 1-(4'-chlorophenyl-bis-phenyl-methyl)-1,2,4-triazole
3. 1-(2'-chlorophenyl-bis-phenyl-methyl)-1,2,4-triazole
4. 1-(4'-fluorophenyl-bis-phenyl-methyl)-1,2,4-triazole
5. 1-(3'-trifluoromethylphenyl-bis-phenyl-methyl)-1,2,4-triazole
7. 1-(3'-chlorophenyl-bis-phenyl-methyl)-1,2,4-triazole lactate
8. 1-(2'-chlorophenyl-bis-phenyl-methyl)-1,2,4-triazole hydrochloride It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. A fungicidal composition comprising an inert carrier and a fungicidally effective amount of a compound selected from the group consisting of 1-trityl-1,2,4-triazole of the formula $$\begin{array}{c} N\text{---}X \\ X\text{---}\underset{N}{\diagdown}N \\ | \\ R\text{---}C\text{---}R'' \\ | \\ R' \end{array}$$

in which each X individually is selected from the group consisting of hydrogen and chloro, R is selected from the group consisting of chlorophenyl, dichlorphenyl, fluorophenyl, cyanophenyl, and trifluoromethylphenyl, and each of R' and R'' is R or phenyl, and a corresponding salt thereof selected from the group consisting of the lactic acid and hydrochloric acid salts.

2. The fungicidal composition according to claim 1 wherein said triazole is selected from the group consisting of
1-(3'-chlorophenyl-bis-phenyl-methyl)-1,2,4-triazole,
1-(4'-chlorophenyl-bis-phenyl-methyl)-1,2,4-triazole,
1-(2'-chlorophenyl-bis-phenyl-methyl)-1,2,4-triazole,
1-(4'-fluorophenyl-bis-phenyl-methyl)-1,2,4-triazole,
1-(3'-trifluoromethylphenyl-bis-phenyl-methyl)-1,2,4-triazole,
1-(3'-chlorophenyl-bis-phenyl-methyl)-1,2,4-triazole lactate and
1-(2'-chlorophenyl-bis-phenyl-methyl)-1,2,4-triazole hydrochloride.

3. A method of combatting fungi which comprises applying to said fungi or their habitat a fungicidally effective amount of a compound selected from the group consisting of 1-trityl-1,2,4-triazole of the formula $$\begin{array}{c} N\text{---}X \\ X\text{---}\underset{N}{\diagdown}N \\ | \\ R\text{---}C\text{---}R'' \\ | \\ R' \end{array}$$

in which each X individually is selected from the group consisting of hydrogen and chloro, R is selected from the group consisting of chlorophenyl, dichlorphenyl, fluorophenyl, cyanophenyl, and trifluoromethylphenyl, and each of R' and R'' is R or phenyl, and a corresponding salt thereof selected from the group consisting of the lactic acid and hydrochloric acid salts.

4. The method of claim 3, wherein R' and R'' are selected from the group consisting of phenyl and chlorophenyl.

5. The method of claim 3, wherein one X is hydrogen, R is selected from the group consisting of, chlorophenyl, 2,4-dichlorophenyl, 4-fluorophenyl, cyanophenyl, and 3-trifluoromethyl-phenyl, and R' and R'' are phenyl.

6. The method of claim 3, wherein said compound is 1-(3'-chlorophenyl-bis-phenyl-methyl)-1,2,4-triazole of the formula

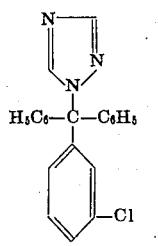

7. The method of claim 3, wherein said compound is 1-(4'-chlorophenyl-bis-phenyl-methyl)-1,2,4-triazole of the formula

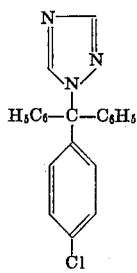

8. The method of claim 3, wherein said compound is 1-(2'-chlorophenyl-bis-phenyl-methyl)-1,2,4-triazole of the formula

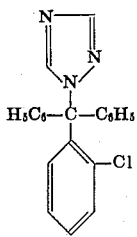

9. The method of claim 3, wherein said compound is 1-(4'-fluorophenyl-bis-phenyl-methyl)-1,2,4-triazole of the formula

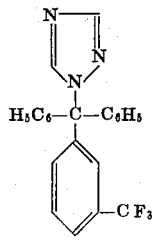

10. The method of claim 3, wherein said compound is 1-(3'-trifluoromethylphenyl-bis-phenyl-methyl)-1,2,4-triazole of the formula

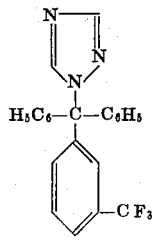

11. The method of claim 3, wherein said compound is 1-(3'-chlorophenyl-bis-phenyl-methyl)-1,2,4-triazole lactate of the formula

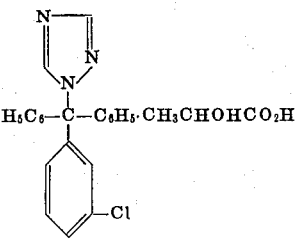

12. The method of claim 3, wherein said compound is 1-(2'-chlorophenyl-bis-phenyl-methyl)-1,2,4-triazole hydrochloroide of the formula

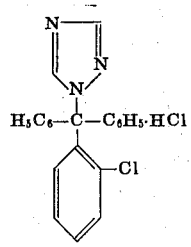

* * * * *